(12) United States Patent
Biró et al.

(10) Patent No.: US 9,594,994 B2
(45) Date of Patent: Mar. 14, 2017

(54) SECURITY ELEMENT AND METHOD TO INSPECT AUTHENTICITY OF A PRINT

(71) Applicants: Attila Biró, Gödöllő (HU); Gábor Kristó, Szigetszentmiklós (HU); Piroska Reményi, Gödöllő (HU)

(72) Inventors: Attila Biró, Gödöllő (HU); Gábor Kristó, Szigetszentmiklós (HU); Piroska Reményi, Gödöllő (HU)

(73) Assignee: Glenisys Kft., Budapest (HU)

( * ) Notice: Subject to any disclaimer, the term of this patent is extended or adjusted under 35 U.S.C. 154(b) by 0 days.

(21) Appl. No.: 14/378,901

(22) PCT Filed: Feb. 15, 2013

(86) PCT No.: PCT/IB2013/051260
§ 371 (c)(1),
(2) Date: Aug. 14, 2014

(87) PCT Pub. No.: WO2013/121401
PCT Pub. Date: Aug. 22, 2013

(65) Prior Publication Data
US 2015/0036890 A1    Feb. 5, 2015

(30) Foreign Application Priority Data
Feb. 15, 2012    (HU) ...................................... 1200097

(51) Int. Cl.
*G06K 9/00* (2006.01)
*G06K 19/06* (2006.01)
(Continued)

(52) U.S. Cl.
CPC ... *G06K 19/06056* (2013.01); *G06K 9/00456* (2013.01); *G06K 9/00577* (2013.01);
(Continued)

(58) Field of Classification Search
CPC ....................................................... G06K 9/34
See application file for complete search history.

(56) References Cited

U.S. PATENT DOCUMENTS

| | | | | |
|---|---|---|---|---|
| 5,189,292 A | * | 2/1993 | Batterman | ........... G06K 7/1093 |
| | | | | 235/456 |
| 7,949,148 B2 | * | 5/2011 | Rhoads | .............. G06K 9/00577 |
| | | | | 356/601 |

(Continued)

FOREIGN PATENT DOCUMENTS

| | | |
|---|---|---|
| FR | 2962828 A1 | 1/2012 |
| WO | 99/35819 A1 | 7/1999 |

OTHER PUBLICATIONS

Nguyen, Trung Hieu, Eng Siong Chng, and Haizhou Li. "T-test distance and clustering criterion for speaker diarization." in Interspeech 2008. 2008.*

(Continued)

*Primary Examiner* — Mekonen Bekele
*Assistant Examiner* — Molly Delaney
(74) *Attorney, Agent, or Firm* — Fitch, Even, Tabin & Flannery LLP (57) ABSTRACT

The invention relates to a security element applied onto printing substrates (bank notes, securities, product packagings, identity cards/labels or other similar documents) by printing, comprising a unique identifier as primary information visible to the naked eye and secondary information protecting against copying non-visible to the naked eye. The unique identifier is typically a point code. Said secondary information is represented by a structure with the largest dimension of 2 to 40 microns, and due to printing distortions arising when the security element is applied onto a printing substrate, said secondary information is non-reconstructable from the print of the security element and a statistically analyzable inherent feature is associated to it. The invention (Continued)

also relates to a printed matter with such an inventive security element and to a method to check authenticity of a printed matter with the inventive security element in visible light (380-750 nm).

12 Claims, 4 Drawing Sheets (51) Int. Cl.
G07D 7/00 (2016.01)
G07D 7/20 (2016.01)
G06K 9/18 (2006.01)
G06K 9/34 (2006.01)
G06T 1/00 (2006.01)
H04N 1/32 (2006.01)

(52) U.S. Cl.
CPC ............... *G06K 9/18* (2013.01); *G06K 9/34* (2013.01); *G06K 19/06028* (2013.01); *G06K 19/06037* (2013.01); *G06T 1/005* (2013.01); *G07D 7/008* (2013.01); *G07D 7/2041* (2013.01); *H04N 1/32251* (2013.01); *H04N 1/32325* (2013.01); *H04N 1/32352* (2013.01); *G06K 2009/0059* (2013.01); *G06T 2201/0051* (2013.01); *G06T 2201/0062* (2013.01); *G06T 2201/0065* (2013.01)

(56) References Cited

U.S. PATENT DOCUMENTS

| | | | | |
|---|---|---|---|---|
| 8,050,502 B2* | 11/2011 | Sato | ................. | G06K 19/06037 382/181 |
| 8,614,834 B2* | 12/2013 | Manfredi | ................. | B41C 1/05 358/1.18 |
| 2003/0141358 A1* | 7/2003 | Hudson | ................. | G06Q 10/087 235/375 |
| 2004/0112962 A1* | 6/2004 | Farrall | ................. | G06K 7/12 235/462.01 |
| 2005/0115425 A1* | 6/2005 | Plaschka | ................. | B42D 25/00 101/170 |
| 2009/0046931 A1* | 2/2009 | Xiao | ................. | G06K 9/38 382/180 |
| 2009/0059304 A1* | 3/2009 | Manfredi | ................. | B41C 1/05 358/3.06 |
| 2014/0295032 A1* | 10/2014 | Magri | ................. | G06K 19/06046 426/87 |
| 2014/0353381 A1* | 12/2014 | Stuck | ................. | B23K 26/0036 235/462.11 |

OTHER PUBLICATIONS

Mandato, D.; European Search Report PCT/IB2013/051260 dated May 9, 2013; 3 pages.

* cited by examiner

SECURITY ELEMENT AND METHOD TO INSPECT AUTHENTICITY OF A PRINT

CROSS-REFERENCE TO RELATED APPLICATIONS

This application is the National Stage of International Application No. PCT/IB2013/051260, filed Feb. 15, 2013, which claims priority to HU P1200097 filed Feb. 15, 2012.

The present invention relates to a security element, as well as to a method to ascertain the authenticity of a print arranged on a printing substrate. Its application field falls into the field of protection of printed matters produced by printing machines or documents generated with ink jet printers and/or laser printers against counterfeiting.

By the time being, photocopying and laser printing technologies have undergone an enormous improvement. As a result, high quality reproduction of various printed matters has become significantly simplified by using these techniques. At the same time, unfortunately, counterfeiting of valuable or personalized printed matters have become easier as well. Thus, the protection of such documents against counterfeiting has come to the fore. Any document provided with a data carrier, such as e.g. a writing or drawing, produced by e.g. a printing machine or an ink jet and/or a laser printer, may constitute a printed matter that requires protection. Such printed matters are, for example, the various packaging labels (e.g. for medicaments, CD covers), valuable entrance tickets, certifications, bank notes, cheques, personal identifiers, various vouchers, etc. just to mention only a few examples. To avoid (or to minimize) misuses, said printed matters are generally provided by appropriate security elements. In general, the security elements applied and/or their combinations are rather complicated.

A great number of solutions exists in the field of print protection. In a class thereof, the security element providing protection is hidden in the printed image itself. International Patent Application Pamphlet No. WO99/35819 and U.S. Patent Application No. 1996/019310 disclose solutions based on just this concept. According to the solutions taught, a secondary image not visible to the naked eye, but visible to a specific decoding device is hidden within a primary image that is visible to the naked eye. The physical parameters of the techniques used to create said secondary image can be chosen in such a manner that the secondary image simply disappears upon copying the substrate (the document) printed upon with the combined image. That is, this information cannot be reconstructed from a copy of the print. To implement the solutions concerned, however, a high-precision printing machine (with a resolution of at least 8000 dpi) is required, and to inspect authenticity of the print, there is a need also for a decoding lens. Due to these drawbacks, the application of said solutions did/could not become well-spread in everyday practice, where—as a consequence of the advancements achieved in digital printing—the protection of printed matters with prints produced by machines generally with much lower resolution (typically of 600 dpi) has to be safeguarded.

The security element disclosed in RU Patent No. 2,430, 836 is a strong security element that can be inspected by the naked eye and gives an extraordinary aesthetical experience. However, the application of the obtained security element onto a printing substrate requires the use of a specific (intaglio) printing machine. Such printing machines are typically owned by banknote printers, and thus the access to such machines is rather limited.

In a further class of print protection, it is the printing ink used to apply the print and/or the printing substrate itself what is made specific, and non-copyable nature is attempted to achieve in this way. Such solutions are disclosed e.g. in EP Patent Nos. 2,004,414; 1,858,605; 1,827,864 and 1,779, 335. The largest drawback of the solutions concerned is due to the specific and, hence, relatively expensive inks (for example, printing inks with optically variable pigments) or the usage of specific printing substrates that can be produced at relatively high costs, too.

In a yet further class of print protection, the print comprises one or more identifiers that can associate the print with a database. U.S. Pat. No. 6,952,485 teaches a so-called electronical watermark as the identifier. Here, a noise incorporated into the image and not visible to the naked eye carries the information. The electronical watermark can be reconstructed from the copy prepared by reproduction without any changes, that is said electronical watermark is always transferred by copying. An application field for said electronical watermarks is the protection of bank notes against copying. In particular, such an electronical watermark is included in Euro banknotes as the security element. This watermark is recognized by the driver of every single printing machine sold nowadays, and then simply refuses to print out the image comprising the electronical watermark. A drawback of this technique lies in the fact that a wide agreement is required amongst the printer and scanner manufacturers as to the electronical watermark used for copy protection. This means that this kind of print protection can be used merely on highly exceptional printed matters. Moreover, the forbidden watermark has to be "taught" to every printer/scanner driver. A further drawback of this technique originates just from the latter: printing devices manufactured before the agreement had been made simply don't recognize the forbidden watermark, and thus they print out the printed matter protected by said watermark.

According to the solution disclosed in International Patent Appl. No. PCT/EP2009/061073, a visible primary identifier and a unique random interference image element (secondary information) that is not visible to the naked eye are arranged on an article to be protected during manufacturing. Said primary identifier and the image element, also referred to as secondary information, are stored in a database over the Internet in digitized form. When genuineness of an article is inspected, based on the primary information, the image stored in the database is looked up and then is compared with a photo of the inspected article taken on the spot. A drawback of the solution lies in that to perform the inspection, an access to the remote database is required in every single case that necessitates the availability of a data communication connection with an appropriate bandwidth.

In a yet further class of print protection, to inspect authenticity of a print, interference of the printing device and the printing support during printing is exploited. U.S. Patent Appl. No. 2002/0037093 relates to a solution wherein a photocopying machine or a laser printer "fouls" the (paper) printing substrate passing through it randomly with toner or ink microdots not visible to the naked eye when the copy is prepared. That is, by analyzing a high-definition digital image of a document, if toner or ink microdots are looked for particularly in portions of said document carrying no print, one can unambiguously decide whether or not the document is generated by copying. A drawback of this technique lies in that to perform the study, a digitizing means of high resolution is required.

Japanese Patent Appl. No. 2009/034921 A discloses a printed matter provided with an antiforgery means comprising a line-patterned latent figure, that is a secondary information. In at least one side edge of each line constituting said latent figure, there is formed a plurality of ink covered extended projection regions protruding along the line width direction, fairly close to one another. When said document is copied, the gaps between respective extended projection regions get buried by ink in harmony with the reproduction characteristics of the copying machine. Consequently, the line width of each line constituting said line pattern expands that practically results in the "development"/appearance of the latent image, as well as of the secondary information.

By the time being, barcodes, Data Matrix codes, various QR-codes, mobile codes, and similar other codes (from now on, point codes, in general) have become well-spread information carrier means. Their popularity is mainly due to the speedy spread of mobile phones, especially of smartphones. Their disadvantage lies in the fact that, in general, they contain no copy protection, and thus their application as security elements are highly limited.

In light of the above, it is apparent that although a plurality of print protection technologies is available to protect prints to be equipped with copy protection and printing substrates/documents having such prints, the technologies are either too expensive or require a specific set of devices for their creation and/or inspection.

It is a natural demand, however, that authenticity of a document could be determined simply and rapidly by anyone and essentially anywhere without the necessity of additional competence and technical equipments.

In light of the above, a primary object of the present invention is to provide a security element applied to a printing substrate by printing which, on the one hand, contains identification data associated with the printed matter itself as primary information and, on the other hand, also provides a reliable copy protection for the printed matter via latent secondary information.

A further object of the present invention is to provide a print protection technique, especially a method to inspect/determine print authenticity that allows authenticity check of a printed matter with a security element according to the invention for anyone and with no qualification in information safety immediately and on the spot by means of devices of at least medium resolution (that is, of 300 to 1200 dpi) that are available in everyday usage, such as e.g. mobile phones, tablets, smartphones, web cameras, etc.

Our studies led us to the conclusion that a security element achieving the object of the invention can be accomplished by combining a suitably chosen code carrying primary information with a piece of secondary information, wherein the secondary information cannot be reconstructed from the print itself (or its copies) but provides an inherent feature that can be analyzed by statistical methods. A structure carrying such secondary information can be generated in the form of areas incorporated (preferentially by the manufacturer) into the code carrying primary information in accordance with a predefined coding concept/algorithm and not printed upon directly. Due to printing distortions/uncertainties, such as e.g. the deformation of the printing substrate and/or the printing plate upon contacting each other or the inevitable ink wetting of the printing ink applied on the printing substrate, arising when printing is executed, the areas left out from direct printing become more or less covered by ink. According to our studies, a condition for said left-out area(s) to be undetectable to the naked eye in the print of the security element is that the largest dimension of said left-out area(s) within the print along at least one direction is 2 to 40 microns, depending on the printing technology applied and the quality of the printing substrate. Although, due to printing uncertainties, the secondary information concerned will not at all be detectable to the naked eye in the print of the security element, neither its ordered nature is recognizable by a loupe (at a magnification of 2-20×), it was found that the incorporation of said secondary information alters the grayscale value of that portion of the digital representation of the print into which it had actually been incorporated. Via altering the grayscale value, said secondary information attributes the inventive security element with an inherent feature that can be analyzed by statistical methods, wherein the result of the analysis is characteristic of the security element itself and thus it can be used as a copy protection element for the security element, as well as for the printing substrate having such a security element.

The object aiming at the provision of a security element is achieved by the security element according to Claim 1. Possible further preferred embodiments of the inventive security element are defined by Claims 2 to 6. The object aiming at providing a method to inspect the authenticity of a print is achieved by the method according to Claim 8. Further preferred variants of the inventive method are set forth in Claims 9 to 11.

In what follows, the invention is discussed in more detail with reference to the attached drawing, wherein.

Figure 1A:
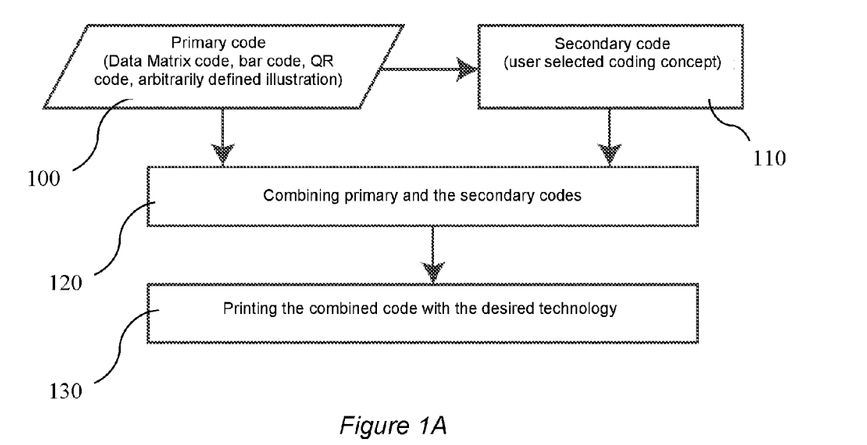
FIG. 1A shows the block diagram of a method to generate a security element according to the invention and to apply it on a printing substrate.

A general method to generate a security element according to the invention formed by a combined code is shown in FIG. 1A. According to this, a code that carries information is chosen (step 100) which is formed by a well-known code sign (e.g. a bar code, a QR code, a Data Matrix code, a mobile code) or a uniquely coded line or point code. According to a yet further possibility, the code carrying primary information can also be formed by a line or point code hidden within an ornamental graphical illustration of the print. Moreover, the code carrying primary information can be the primary information itself, printed simply onto the printing substrate in an uncoded manner. The printing substrate can be any document or the surface of an object to be protected; in particular, e.g. banknotes, securities, invoices, product packagings, identity cards/labels, covers, entrance tickets, certificates, personal documents, vouchers or any other similar documents. Primary information means a piece of information that relates to the document to be protected, generally, the data identifying the document itself. It is of importance that the code carrying primary information could be segmented, i.e. could be covered by a mesh of cells of given size and typically of regular shape (in particular, rectangular shape), being optionally rotated with a given angle relative to the code carrying primary information. Due to the constructional design, this latter requirement is automatically fulfilled for the above mentioned well-known code signs.

Figure 6:
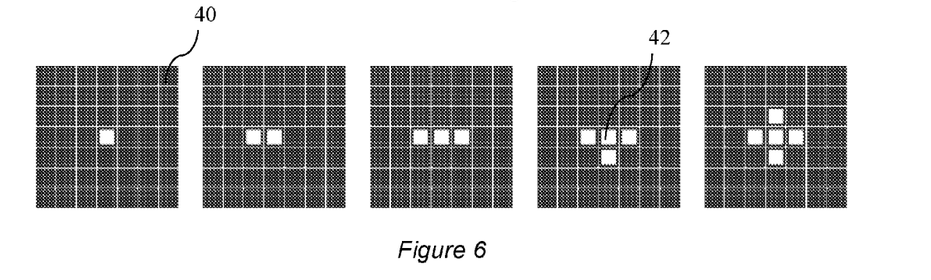
FIG. 6 illustrates a couple of possible preferred embodiments of the left-out area(s) (pixels) representing secondary information that are applicable in a security element according to the invention.

After selecting the code carrying primary information, a code that carries secondary information is generated (step 110). This step is performed in harmony with a preset coding concept/algorithm in a way discussed for a specific example in what follows with reference to FIGS. 2 to 4 in more detail. In particular, the secondary information is carried by the areas left out from the print of the code carrying primary information. Due to its size, the code carrying secondary information is a piece of latent information, i.e. it is not visible when inspected by the naked eye. Such exemplary secondary information defined by the left-out areas are illustrated in FIGS. 3 and 6. The secondary information preferably results from the primary information, e.g. from an element/data thereof.

After generating the code carrying secondary information, the codes carrying primary and secondary information are combined together (step 120), as a result of which a combined code that corresponds to the inventive security element is obtained.

Finally, the printed matter with the security element is produced by applying the thus obtained security element onto the printing substrate via the selected printing technology (step 130).

The security element of the printed matter produced by the method shown in FIG. 1A, on the one hand, contains data that can be used to identify said printed matter (primary information) and, on the other hand, is suitable for protecting said printing matter against copying, as the secondary information is a latent information that is not visible to the naked eye and disappears or gets distorted in a detectable manner when being printed/copied.

Figure 2:
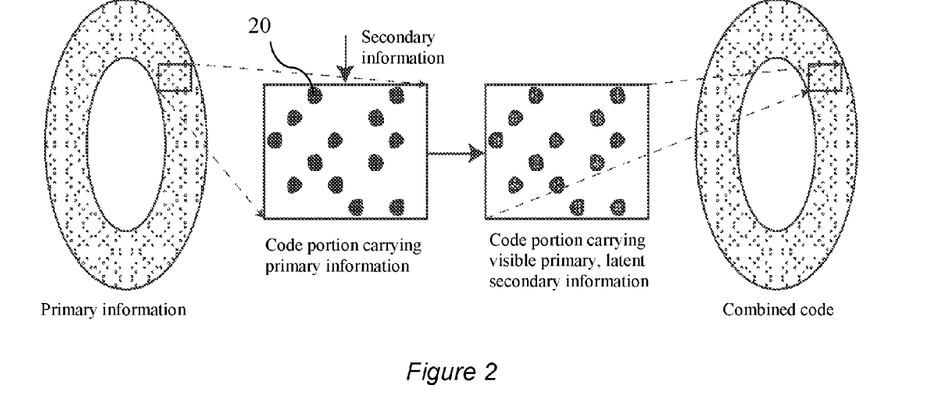
FIG. 2 shows schematically the way of generating a combined code, that constitutes the security element, from codes carrying primary and secondary information.
Figure 3:
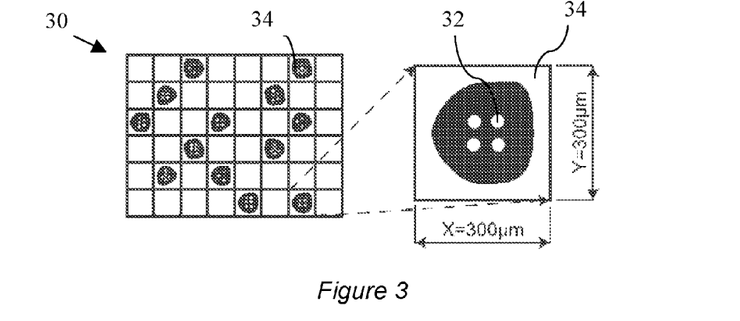
FIG. 3 shows a portion of the combined code of FIG. 2 in enlarged view.
Figure 4:
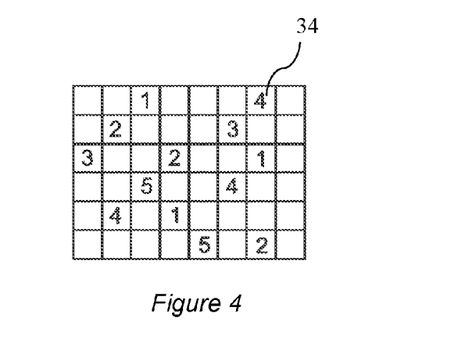
FIG. 4 illustrates the decomposition of the combined code portion shown in FIG. 3 into classes in terms of the secondary information, performed along with a coding concept set by the manufacturer.
Figure 5:
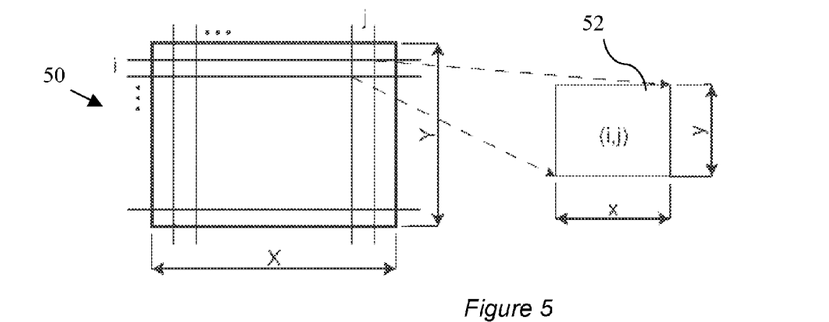
FIG. 5 shows a generalized code cell applicable when the secondary information is introduced into a point code.

FIGS. 2 to 4 illustrates the steps of combining together the codes carrying first and second information in a specific case, wherein the code carrying primary information is provided by a point code (see FIG. 2) formed by ink dots 20 and representing a figure "0" printed at the resolution of 600 dpi, wherein segmenting is performed by means of a mesh 30 of square shaped cells 34 (see FIG. 3). Here, the size of each cell 34 is at least 300 microns along both the X and Y directions. It was found that the size of 300 microns is sufficient to ensure that each individual ink dot 20 fall into a separate cell 34 and far away from the borders of said cell 34 (that is, practically to the middle of the cell 34). Furthermore, each cell 34 is divided into seven pixels 40 (in this specific case); the pixels 40 forming units of said division are the "building blocks" for the left-out areas 42 encoding secondary information. It is apparent to a skilled person in the art that segmenting can be performed with different cell sizes and/or with different numbers of pixels along the X, Y directions per cells for a different type of code sign. A common rectangular mesh 50 and its (i,j)-th cell 52 applicable for segmenting are shown in FIG. 5. It is also noted here that if higher resolution is used, the pixel number along each of the directions has to be increased proportionally.

Having segmented the code that carries primary information, introduction of the code that carries secondary information is performed. To this end, the cells 34 of the code carrying primary information obtained by the segmentation and containing an ink dot, are sorted into several classes. Here, the number of various classes is chosen to fall between four and six, however, any other number of classes can be equally used. Since after printing the inventive security element, the secondary information leads to a feature that can be analyzed by statistical techniques, preferably there are at least ten cells 34 in each class. Said sorting may take place on a regular basis or in a random manner, however, it always follows from the code carrying primary information. In the present example, classification is performed in terms of the number of pixels forming the left-out area within each cell. Here, the number inscribed into a given cell corresponds to the size of the left-out area within the cell, expressed in pixels. The size of the left-out area changes from class to class in a strictly increasing manner. Consequently, for example, the first class remains unaltered (i.e. there is no left-out area therein), the second class will have a left-out area of one pixel, the third class will have a left-out area of at least two pixels, the forth class will have a left-out area of at least three pixels, and so on.

The size of the left-out area in each cell 34 depends on the printing technology to be applied: the size/dimension of the left-out area is always chosen in such a manner that the printing technology applied is just inadequate to print said left-out area sharply. Consequently, due to printing uncertainty of the left-out areas, said areas will not at all be visible in the printed security element when inspected by the naked eye. Furthermore, the ordered nature of the secondary information is not recognizable by a loupe (at a magnification of 2-20×) either.

Several examples for the possible shape of the left-out areas formed of pixels are shown in FIG. 6. Shape and dimension of the left-out area cannot be arbitrary, the latter is limited by the printing technology to be applied, as discussed above. In Table 1 below, a couple of white printability line widths proposed for the preparation of the inventive security element, obtained empirically by performing ink wetting experiments on a printing substrate is collected for different printing technologies. The ink wetting measurements were carried out with printing inks tailored to various printing technologies, that is, e.g. with a black printing ink from Hewlett Packard, with a black printing ink from MEMJET, with the KODAK Prosper press black ink and a black printing ink from EPSON, wherein fibrous paper used typically for security printing was applied as the printing substrate at the temperature of 18-22° C. (room temperature) and at 101 kPa ambient pressure. It is noted here that the values enlisted in Table 1 are valid for other kinds of paper as well, although the required resolution generally changes. In particular, if the printing substrate is e.g. a glossy paper, printing has to be performed at the resolution of at least 600-1200 dpi instead of 300-600 dpi.

In line with the above, when a novel printing technology becomes available, the ink wetting can be determined on a pilot print and then a proposed white printability line width for the left-out area expressed in number of pixels can be derived for the novel technology. To this end the following empirical equations can also be used:

Line width [micron]=1.2*ink wetting [micron].

Line width [pix]=the greatest integer of {(1.2*ink wetting [micron]*resolution [dpi]/25.4)/1000+ 0.5}, but at least 1.

TABLE 1

Line width of left-out areas carrying secondary information.

| Technology | Typical resolution [dpi] | Ink wetting [micron] (paper dependent) | White printability line width (of an area left out from direct printing) | |
|---|---|---|---|---|
| | | | [micron] | [pix] |
| Ink jet printing | 600 | 10-50 | 12-60 | 1-2 |
| Laser printing | 720 | 30-40 | 36-48 | 2-3 |
| Offset printing | 8000 | 10-20 | 12-24 | 4-8 |

Although the areas left out from direct printing are not visible to the naked eye in the print of the security element, due to printing uncertainties they change the grayscale of the cell defined by the expression of grayscale value=(number of black pixels in the cell)/(number of total pixels in the cell);

here, the change is inversely proportional to the increase in the number of pixels of the left-out area within the class considered. Hence, the inventive security element provided by the combined code discussed above exhibits an inherent feature in the form of the above defined grayscale values that can be associated with the latent secondary information; after printing out the security element and generating a digital representation of the obtained print said inherent feature can be analyzed statistically.

Figure 1B:
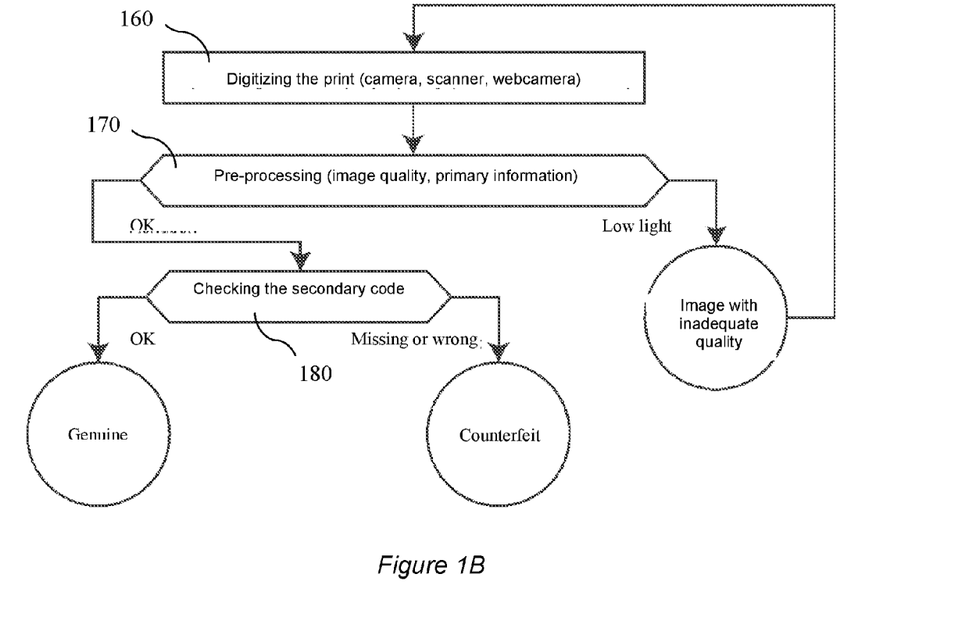
FIG. 1B illustrates the block diagram of an authenticity inspection method based on the application of a security element according to the invention.

Decoding the inventive security element applied on a printing substrate and, as a result of this, deciding on the authenticity of the printed matter concerned are performed in line with the scheme shown in FIG. 1B. According to this, in a first step a digital representation of the code sign carrying primary information of said security element is generated (step 160) in visible light falling into the wavelength range of 380 to 750 nm or by making use of a light source providing illumination that spectrally corresponds to natural light falling into said wavelength range by means of a suitable digital imaging means, such as a mobile phone, a smartphone, a (hand) scanner, a web camera, optionally a camera, having typically a medium resolution.

After this step, pre-processing of the image of the code sign is performed (step 170), wherein at first the quality of the image is inspected: in case of an image with inadequate quality (due to e.g. insufficient illumination), the image of the code sign is disregarded and a new code sign image is recorded. If said code sign is hidden into an ornamental illustration, separating the image of the code sign from the ornamental illustration is also performed during pre-processing. The manner of executing the separation depends on the way of hiding; in this respect, International Publication Pamphlet No. WO99/35819, mentioned earlier, discloses a possible exemplary solution in detail. Further separation methods are known to a skilled person in the art and, hence, are not discussed here in more detail. As a finishing step of pre-processing, the image of the code sign is converted into a gray shaded image and the thus obtained grayscale image is then stored for further analysis.

After completing the above pre-processing steps in good order, a check of the secondary information introduced into the code carrying primary information at the time of generating the security element applied to the printed matter is carried out (step 180). To this end, the classification of dots based on the code carrying primary information is performed again. After completion of the classification, a statistical analysis of the grayscale values of the obtained classes is carried out. For the image taken of a genuine print, the grayscale values of the classes have to decrease continuously. The statistical analysis is required because of the camera distortion. Here, the two-sample t-test is a suitable method with the hypothesis of mean1=mean2 against the alternative hypothesis of mean1<mean2 with a significance level of p=0.05. To a skilled person in the art it is clear that, instead of t-test, other statistical tests are equally applicable in this case.

Upon copying, the pixel islands forming the tiny left-out area get closed up, and thus an increase in grayscale mean values of the classes no longer maintains. The closing-up is caused by the steps during copying. As far as this process is concerned, the number of pixels forming the left-out area and the arrangement of said pixels are of high importance. Said left-out area has to exhibit a width, along at least one of its dimensions, that corresponds to the white printability line width given in Table 1 in order that the used scanner or photocopying machine could remove the pixels of the left-out area for sure. In such a case, the inspected printed matter is considered to be a "counterfeit". If, as a result of the statistical analysis, it can be stated that the increase in grayscale mean values of the classes maintains, the inspected printed matter provided with the inventive security element is considered to be "genuine".

Figure 7:
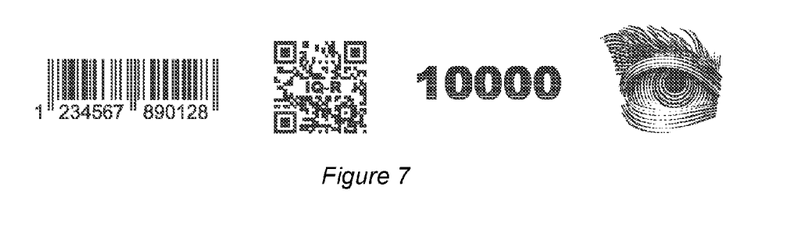
FIG. 7 shows several exemplary point codes (visible to the naked eye) carrying primary information that have the largest dimension greater than 50 microns.

FIG. 7 illustrates a couple of exemplary point codes carrying primary information (visible to the naked eye), in particular, from left to right, a bar code, a QR code, a Data Matrix code and a so-called design code, wherein each of them exhibits a greatest dimension exceeding 50 microns. To generate the security element according to the invention, all of them can be used.

Figure 8:
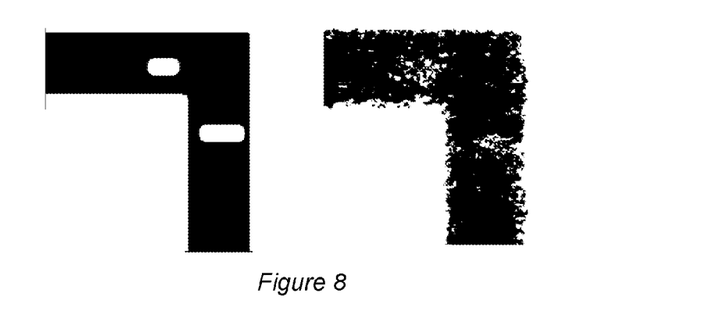
FIG. 8 illustrates the theoretical appearance (as formed in a printing plate) and the actual appearance (as seen after having printed onto a printing substrate) of a portion of the security element provided by the combined code.

The closing-up of white islands carrying secondary information of a print produced by an ink jet printer is shown in FIG. 8 taken by a field microscope at a magnification of 50×. While the left-out area of the printing plate on the left side exhibits sharp borderlines, the left-out areas can be hardly detected in the print on the right side. Moreover, upon copying, these uncertain spots are closed by the photocopying machine, and the photocopy becomes black in 100%.

Figure 9A:
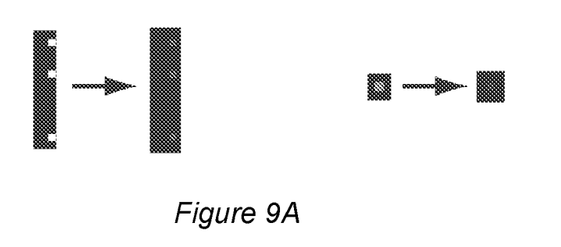
FIGS. 9A and 9B illustrate a piece of secondary (latent) information that has a dimension of at most 50 microns along at least one direction, hidden into a point like and a line like design, respectively, before and after printing.
Figure 9B:
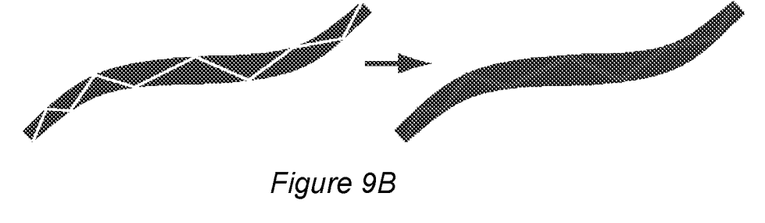

FIGS. 9A and 9B illustrate some examples for a piece of secondary information hidden into designs.

Briefly summarized: to accomplish the present invention in practice, a specific inspection device is not absolutely necessary; to this end, a photo taken by e.g. an ordinary smartphone and a decoding and analyzing software based on the method shown in FIG. 1B installed in the phone are sufficient. (Nevertheless, the photo or the digital representation of the security element can be taken by any other camera as well, and the analyzing software can be executed by any computer with appropriate computing capacity.) The inspection device can be a custom-built device; it should contain a reader unit (CCD, CMOS), for example a digital camera, for generating a digital representation of the security element, a data processing unit, for example a microcontroller or a processor, preferably a memory unit, as well as the decoding software itself. Application of the inventive security element on a printing substrate does not require a printing machine of high-precision; to this end an ink jet printer with the resolution of even 600 dpi is appropriate. This allows a wide range applicability for the solution according to the present invention.

As the secondary information, in general, is not stored in a database, to inspect authenticity of a printed matter with the security element according to the invention, there is no need for a data communication link. The latent (secondary) information can be deduced from the primary information, and hence, it is merely the inspection device that is actually needed for the authenticity check.

For a skilled person in the art it is, however, apparent that the previously selected coding concept for the secondary information (or its generating key) can be stored in a remote database. In such a case, within the framework of the method for authenticity inspection, the inspection device establishes a connection with the database through an appropriate data communication channel, interrogates the generating key needed, and then performs the authenticity check of the printed matter challenged. A further advantage of such an embodiment is that said inspection device can also provide precise information for the data-base about the geographical location of the key interrogation as a consequence of the data communication established. If the inspection device is a mobile phone or a smartphone, said information can easily be provided in the form of either the mobile base data or GPS coordinates.

Furthermore, when a security element according to the present invention is to be applied, neither expensive printing ink(s) of specific composition nor specifically produced expensive printing substrates are required. As it is also apparent to a skilled person in the art, the inventive security element can also be formed on/in a surface of the object to be protected by laser ablation instead of ink printing. In case of such applications, the paper-based substrate is replaced by any materials that can be machined by laser ablation.

It is also clear for a skilled person in the art that the security element according to the present invention can be used alone or in combination with other security elements as an additional element thereto.

The invention claimed is:

1. Security element as originally applied by a printing technology to a substrate as a print, the security element comprising a code carrying primary information and detectable to the naked eye in visible light within the wavelength range of 380 to 750 nm, as well as a code carrying secondary information and that is undetectable in the naked eye,
wherein the largest dimension of the code carrying secondary information in at least one planar direction is 2 to 40 microns,
wherein the largest dimension of the code carrying secondary information is chosen based on resolution of the printing technology in such a way that the code carrying secondary information is distorted as a result of printing onto the substrate to render the code carrying secondary information non-reconstructable from the print and the code carrying secondary information attributes the security element with a predetermined statistically analyzable feature.

2. The security element according to claim 1, characterized in that the statistically analyzable feature is provided by grayscale values of portions of a digital representation of the print of said security element taken in visible light within the wavelength range of 380 to 750 nm, said portions being selected according to a preset coding concept.

3. The security element according to claim 1, characterized in that the code carrying primary information is chosen from a group consisting of: bar codes, QR codes, Data Matrix codes, and uniquely developed point codes with non-public coding.

4. The security element according to claim 1, characterized in that the printing substrate is provided with an ornamental graphical illustration and said code carrying primary information is hidden in said illustration.

5. The security element according to claim 1, characterized in that the secondary information can be derived from the primary information.

6. The security element according to claim 1, characterized in that the printing substrate is chosen from a group consisting of: banknotes, securities, invoices, product packagings, identity cards/labels, covers, entrance tickets, certificates, personal documents, vouchers or any other similar documents or object surfaces to be equipped with copy protection.

7. A printed matter, characterized in that said printing matter comprises a printing substrate and at least one security element according to claim 1, applied onto the printing substrate by printing.

8. A method to inspect authenticity of a printed matter with a security element according to claim 1, comprising the steps of:
recording an image of the code carrying primary information of the security element along with illumination by visible light within the wavelength range of 380 to 750 nm;
converting the obtained image into a grayscale image and storing the grayscale image;
segmenting the grayscale image stored;
sorting segments of the segmented grayscale image into a given number of classes based on a number of pixels forming a left out area in each segment;
assigning a grayscale mean value, as a statistically analyzable feature, to each class by subjecting said classes one after the other to statistical analysis;
generating a trend from the obtained grayscale mean values from class to class;
confirming authenticity of said printed matter when said trend matches a predetermined trend of increasing grayscale mean values; and
denying authenticity of said printed matter when said trend does not match the predetermined trend of increasing grayscale mean values.

9. The method according to claim 8, wherein said image is generated by an imaging device with a resolution of 300 to 1200 dpi.

10. The method according to claim 8, also comprising the step of separating the image of the code carrying primary information from an ornamental illustration if said code is hidden in the ornamental illustration before converting said recorded image of the code into the grayscale image.

11. The method according to claim 8, wherein said statistical analysis of classes is performed by two-sample t-test of pairs of the classes.

12. The security element according to claim 1, wherein the code carrying secondary information is generated by areas of the code carrying primary information not printed upon directly.

* * * * *